US012581285B2

(12) United States Patent
Fu et al.

(10) Patent No.: US 12,581,285 B2
(45) Date of Patent: Mar. 17, 2026

(54) METHOD FOR TRAFFIC DESCRIPTOR TRANSMISSION AND RELATED DEVICES

(71) Applicant: SPREADTRUM COMMUNICATIONS (TIANJIN) CO., LTD., Tianjin (CN)

(72) Inventors: Zhiwei Fu, Tianjin (CN); Miao Miao, Tianjin (CN)

(73) Assignee: SPREADTRUM COMMUNICATIONS (TIANJIN) CO., LTD., Tianjin (CN)

( * ) Notice: Subject to any disclaimer, the term of this patent is extended or adjusted under 35 U.S.C. 154(b) by 456 days.

(21) Appl. No.: 18/041,431

(22) PCT Filed: Oct. 21, 2020

(86) PCT No.: PCT/CN2020/122447
§ 371 (c)(1),
(2) Date: Feb. 13, 2023

(87) PCT Pub. No.: WO2022/032865
PCT Pub. Date: Feb. 17, 2022

(65) Prior Publication Data
US 2023/0300601 A1     Sep. 21, 2023

(30) Foreign Application Priority Data
Aug. 13, 2020     (CN) ......................... 202010815222.4

(51) Int. Cl.
*H04W 8/22*          (2009.01)
*H04W 8/18*          (2009.01)
(Continued)

(52) U.S. Cl.
CPC ............. *H04W 8/22* (2013.01); *H04W 8/183* (2013.01); *H04W 12/35* (2021.01); *H04W 24/02* (2013.01); *H04W 12/108* (2021.01); *H04W 40/02* (2013.01)

(58) Field of Classification Search
CPC ....... H04W 8/22; H04W 8/183; H04W 12/35; H04W 12/108; H04W 40/02; H04W 24/02
See application file for complete search history.

(56) References Cited

U.S. PATENT DOCUMENTS

| | | |
|---|---|---|
| 10,602,422 B1 | 3/2020 | Jagannatha et al. |
| 2018/0278534 A1 | 9/2018 | Giaretta et al. |
| | (Continued) | |

FOREIGN PATENT DOCUMENTS

| | | | | |
|---|---|---|---|---|
| CN | 105103497 A | 11/2015 | | |
| CN | 107241783 A | * 10/2017 | ........ | H04W 52/0225 |
| | (Continued) | | | |

OTHER PUBLICATIONS

WIPO, International Search Report and Written Opinion for International Application No. PCT/CN2020/122447, May 7, 2021.
(Continued)

*Primary Examiner* — Rebecca E Song
*Assistant Examiner* — Gary A Miller
(74) *Attorney, Agent, or Firm* — HAUPTMAN HAM, LLP

(57)          ABSTRACT
A method for traffic descriptor (TD) transmission and related devices are provided in implementations of the disclosure. The method includes: obtaining, by a terminal, a first profile of a first application, where the first profile includes a TD parameter of the first application, and the TD parameter includes TD parameters of multiple operators contracted with the first application.

16 Claims, 3 Drawing Sheets

(51) Int. Cl.

| | | |
|---|---|---|
| *H04W 12/30* | (2021.01) |
| *H04W 24/02* | (2009.01) |
| *H04W 12/108* | (2021.01) |
| *H04W 40/02* | (2009.01) |

(56) References Cited

U.S. PATENT DOCUMENTS

| | | | |
|---|---|---|---|
| 2019/0349837 A1 * | 11/2019 | Shih et al. ........... | H04W 48/08 |
| 2019/0394279 A1 | 12/2019 | Dao et al. | |
| 2021/0243664 A1 * | 8/2021 | Huang-Fu et al. ... | H04W 36/14 |
| 2022/0150991 A1 * | 5/2022 | Yang et al. .......... | H04W 76/10 |

FOREIGN PATENT DOCUMENTS

| | | | | |
|---|---|---|---|---|
| CN | 108901015 A | 11/2018 | | |
| CN | 109429277 A | 3/2019 | | |
| CN | 110224857 A | 9/2019 | | |
| CN | 111034267 A | 4/2020 | | |
| CN | 111034268 A | 4/2020 | | |
| CN | 111404814 A * | 7/2020 | ............ | H04L 45/14 |
| CN | 111436081 A | 7/2020 | | |
| WO | WO-2020062233 A1 * | 4/2020 | ............ | G06F 9/445 |
| WO | 2020107751 A1 | 6/2020 | | |
| WO | WO-2021056573 A1 * | 4/2021 | ........... | H04W 40/00 |
| WO | WO-2021243511 A1 * | 12/2021 | ............ | H04W 48/14 |

OTHER PUBLICATIONS

Ericsson, "KI#2, new solution, policy based control", SA WG2 Meeting#S2-139E, S2-2003608, Jun. 12, 2020.

The first office action issued in corresponding CN application No. 202010815222.4 dated Aug. 2, 2021.

Georgoulas, S et al. Joint measurement- and traffic descriptor-based admission control at real-time traffic aggregation points, Jan. 1, 2004.

Notice of allowance issued in corresponding CN application No. 202010815222.4 dated Jan. 18, 2022.

* cited by examiner

100

120

110

120

MEMORY

110

PROCESSOR

130

I/O DEVICE

1

METHOD FOR TRAFFIC DESCRIPTOR TRANSMISSION AND RELATED DEVICES

CROSS-REFERENCE TO RELATED APPLICATION(S)

This application is a national stage of international application no. PCT/CN2020/122447, filed on Oct. 21, 2020, which claims priority to Chinese patent application no. 202010815222.4, filed Aug. 13, 2020, the entire disclosures of which are hereby incorporated by reference.

TECHNICAL FIELD

The disclosure relates to the field of communication technology, in particular to a method for traffic descriptor transmission and related devices.

BACKGROUND

In the 3rd generation partnership project (3GPP) protocol, evaluation of a user equipment route selection policy (URSP) requires the matching between a traffic descriptor (TD) parameter associated with an application and a TD parameter in a URSP rule. Then, a corresponding routing path is established for the application based on a successfully matched route selection descriptor (RSD) in the URSP rule. Currently, how to configure the TD parameter of the application for a terminal is not clearly agreed in the protocol.

SUMMARY

Implementations of the disclosure provide a method for traffic descriptor (TD) transmission and related devices, to provide a method for configuring a TD parameter for a terminal through a profile, which can improve efficiency of configuring the TD parameter for an application of the terminal.

In a first aspect, implementations of the disclosure provide a method for TD transmission. The method includes: obtaining, by a terminal, a first profile of a first application, where the first profile includes a TD parameter of the first application, and the TD parameter includes TD parameters of multiple operators contracted with the first application.

In a second aspect, implementations of the disclosure provide a method for TD transmission. The method includes: sending, by a network device, a first profile of a first application to a terminal, where the first profile includes a TD parameter of the first application, and the TD parameter includes TD parameters of multiple operators contracted with the first application.

In a third aspect, implementations of the disclosure provide a device for TD transmission. The device includes: an obtaining unit configured to obtain a first profile of a first application, where the first profile includes a TD parameter of the first application, and the TD parameter includes TD parameters of multiple operators contracted with the first application.

In a fourth aspect, implementations of the disclosure provide a device for TD transmission. The device includes: a sending unit configured to send a first profile of a first application to a terminal, where the first profile includes a TD parameter of the first application, and the TD parameter includes TD parameters of multiple operators contracted with the first application.

In a fifth aspect, implementations of the disclosure provide a terminal. The terminal includes a processor, a memory, a communication interface, and one or more programs stored in the memory and configured to be executed by the processor. The one or more programs include instructions configured to execute operations in in any method of the first aspect.

In a sixth aspect, implementations of the disclosure provide a network device. The network device includes a processor, a memory, a communication interface, and one or more programs stored in the memory and configured to be executed by the processor. The one or more programs include instructions configured to execute operations in any method of the second aspect.

In a seventh aspect, implementations of the disclosure provide a chip. The chip includes a processor configured to invoke a computer program from a memory and run the computer program, to cause a device on which the chip is installed to perform part or all of operations described in any method of the first aspect or the second aspect of implementations of the disclosure.

In an eighth aspect, implementations of the disclosure provide a computer-readable storage medium storing a computer program for electronic data interchange, where the computer program causes a computer to perform part or all of operations described in any method of the first aspect or the second aspect of implementations of the disclosure.

In a ninth aspect, implementations of the disclosure provide a computer program. The computer program is operable to cause a computer to perform part or all of operations described in any method of the first aspect or the second aspect of implementations of the disclosure. The computer program can be a software installation package.

As can be seen, in implementations of the disclosure, the terminal obtains the first profile, where the first profile includes the TD parameter of the first application, and the TD parameter includes TD parameters of the multiple operators contracted with the first application. Therefore, through parsing the profile once, the terminal can obtain the TD parameter configuration information of all operators contracted with the first application, without redundant operations, which improves the efficiency of configuring the TD parameter for the application of the terminal.

BRIEF DESCRIPTION OF THE DRAWINGS

The accompanying drawings used in description of implementations or the related art will be briefly described below.

DETAILED DESCRIPTION

The technical solutions in implementations of the disclosure will be described below with reference to the accompanying drawings.

The concepts and terms referred to in the disclosure are defined or interpreted as follows.

The concepts and terms referred to in the disclosure are defined or interpreted as follows.

An application (APP) refers to various applications, such as a video application, a browser application, and the like installed on a device.

A mobile country code (MCC) consists of 3 digits, which uniquely identifies a country to which a mobile subscriber belongs. Our country is 460.

A mobile network code (MNC) consists of two digits, which is used to identify a mobile network to which the mobile subscriber belongs. The GSM PLMN network of post and telecommunications department is 00, and the GSM PLMN network of China Unicom company is 01.

A protocol data unit (PDU) refers to a data unit transferred between peer layers. The PDU of the physical layer is a data bit, the PDU of the data link layer is a data frame, the PDU of the network layer is a data packet, the PDU of the transport layer is a data segment, and the PDU of another higher layer is data.

A PDU session is a granularity unit of the network slice in the fifth-generation (5G) mobile communication system.

Network slicing is an on-demand networking method, which can separate multiple virtual end-to-end networks from a unified infrastructure. Each network slice is logically isolated on a RAN, a bearer network, and a core network (CN) to adapt to various applications. A network slice can be divided into at least three parts: a wireless network sub-slice, a bearer network sub-slice, and a core network sub-slice.

A user equipment route selection policy (URSP) is policy information provided by the 5G core network (5GC) from a policy control function (PCF) to a UE. The UE determines how to route data to an outgoing path based on the URSP. Based on a URSP rule, the UE can determine whether a detected application can be associated with an established PDU session, whether data can be routed to a non-3GPP path other than the PDU session, or whether a new PDU session can be established. Important input data in the URSP rule is parameters in traffic descriptors (TD), and the application can carry these parameters when initiating a network request. After an operating system (OS) obtains the TD parameter associated with the application and the UE obtains a URSP rule list from the network, a route selection descriptor (RSD) matched is obtained based on evaluation of the URSP rules and then data routing is selected based on a routing path indicated by the RSD parameter.

Figure 1A:
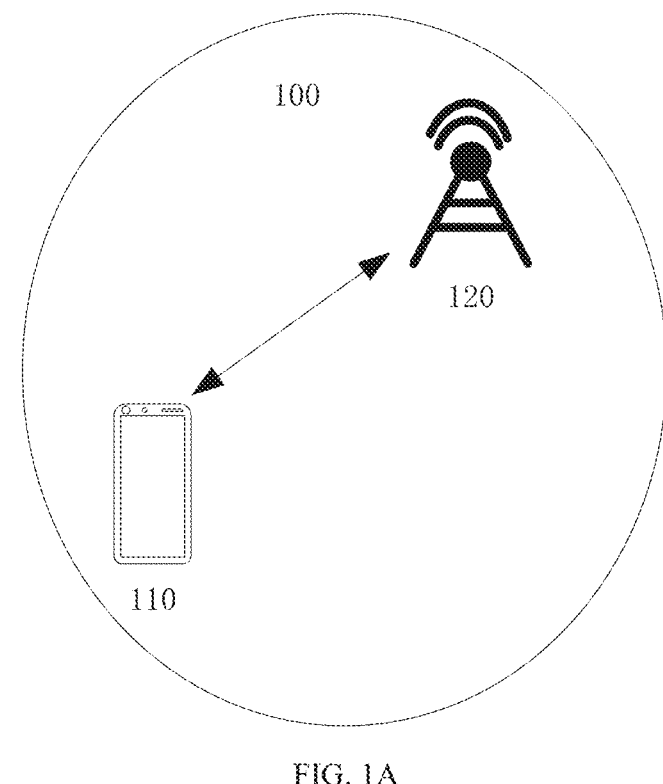
FIG. 1A is a system architecture diagram of an example communication system provided in implementations of the disclosure.

Technical solutions of implementations of the disclosure are applicable to an example communication system 100 illustrated in FIG. 1A. The example communication system 100 includes a terminal 110 and a network device 120. The terminal 110 is communicatively connected to the network device 120.

The example communication system 100 may be, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a next-generation communication system, or other communication systems.

Generally, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations of the disclosure can also be applied to these communication systems. Optionally, a communication system of implementations of the disclosure may be applied to a carrier aggregation (CA) scenario, a dual connectivity (DC) scenario, or a standalone (SA) network deployment scenario.

A spectrum applied is not limited in implementations of the disclosure. For example, implementations of the disclosure may be applicable to a licensed spectrum, and may also be applicable to an unlicensed spectrum.

Figure 1B:
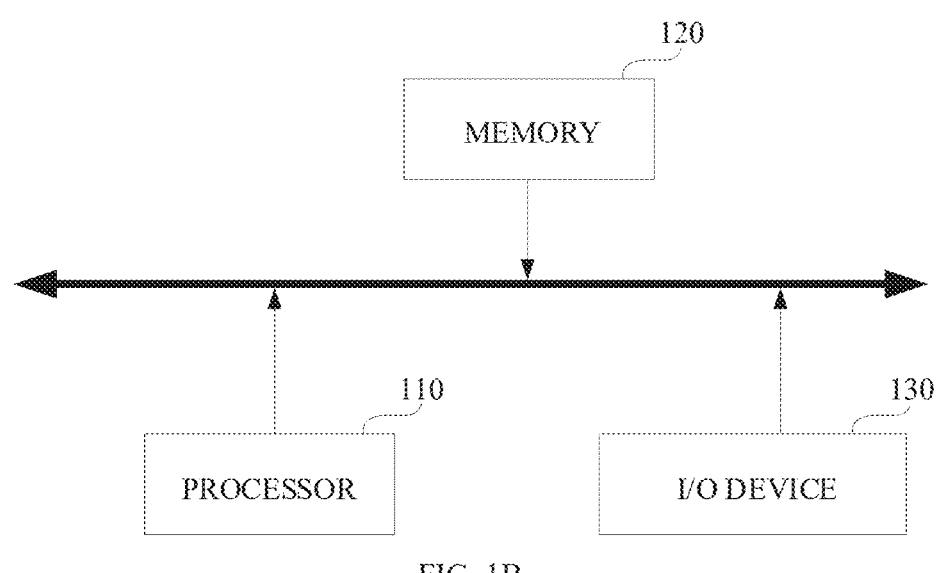
FIG. 1B is a schematic structural diagram of a terminal provided in implementations of the disclosure.

The terminal 110 of implementations of the disclosure may refer to a UE, an access terminal, a subscriber unit, a subscriber station, a mobile station, a remote station, a remote terminal, a mobile device, a user terminal, a terminal, a wireless communication device, a user agent, or a user device. The terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, a relay device, an in-vehicle device, a wearable device, a terminal in a 5G network, a terminal in a future evolved public land mobile network (PLMN), or the like, which is not limited herein. As illustrated in FIG. 1B, the terminal 110 in implementations of the disclosure may include one or more of: a processor 110, a memory 120, and an input/output (I/O) device 130. The processor 110 is communicatively connected with the memory 120 and the I/O device 130 respectively.

The network device 120 of implementations of the disclosure may be a device that communicates with the terminal. The network device may be an evolved Node B (eNB or eNodeB) in the LTE system, or may be a radio controller in a cloud radio access network (CRAN). Alternatively, the network device may be a relay device, an access point, an in-vehicle device, a wearable device, a network device in the 5G network, or a network device in a future evolved PLMN, an antenna panel or a group of antenna panels (including multiple antenna panels) of a base station in the 5G system, or may be a network node forming a gNB or a transmission point, such as a baseband unit (BBU) or a distributed unit (DU), which is not limited herein.

In some deployments, the gNB may include a centralized unit (CU) and a DU. The gNB may further include an active antenna unit (AAU). The CU implements some functions of the gNB, and the DU implements some other functions of the gNB. For example, the CU is responsible for processing non-real-time protocols and services, and implements functions of a radio resource control (RRC) layer and functions of a packet data convergence protocol (PDCP) layer. The DU is responsible for processing physical (PHY) layer protocols and real-time services, and implements functions of a radio link control (RLC) layer, functions of a media access control (MAC) layer, and functions of a PHY layer. AAU implements some PHY layer processing functions, radio frequency processing functions, and active-antenna related functions. Since RRC layer information will eventually become PHY layer information, or is transformed from PHY layer information, in this architecture, it may be considered that higher layer signaling, such as RRC layer signaling, is transmitted by the DU, or transmitted by the DU and the AAU. It can be understood that, the network device may be a device including one or more of a CU node, a DU node, and an AAU node. In addition, the CU may be categorized as a network device in a radio access network (RAN), or may be categorized as a network device in a core network (CN), which is not limited herein.

In implementations of the disclosure, the terminal 110 or the network device 120 includes a hardware layer, an operating system layer running above the hardware layer, and an application layer running above the operating system layer. The hardware layer includes hardware such as a central processing unit (CPU), a memory management unit (MMU), and a memory (also referred to as main memory). The operating system may be any one or more computer operating systems that achieve service processing through a process, for example, a Linux operating system, a Unix operating system, an Android operating system, an iOS operating system, or a Windows operating system. The application layer includes applications such as a browser, a contact list, word processing software, and instant messaging (IM) software. In addition, implementations of the disclosure do not constitute limitation on the structure of an execution entity of a method provided in implementations, as long as the execution entity can communicate based on the method provided herein by running programs that record codes of the method. For example, the execution entity of the method may be the terminal, or may be a functional module in the terminal that can invoke and execute programs.

The URSP is one of the policy information provided by the 5GC from the PCF entity to the UE. The UE determines how to route data to an outgoing path based on the URSP. Based on the URSP rule, the UE can determine whether a detected application can be associated with an established PDU session, whether data can be routed to a non-3GPP path other than the PDU session, or whether a new PDU session can be established.

The URSP contains one or more URSP rules. The URSP rule includes the following.

1. URSP priority
2. traffic descriptor, including the following parameter:
   1) match-all traffic descriptor, or
   2) at least one of the following parameters:
     a. one or more application identifiers
     b. one or more IP descriptors
     c. one or more non-IP descriptors (mutually exclusive with IP descriptors)
     d. one or more data network names (DNN)
     e. one or more connection capabilities (there are four types: IMS, SUPL, Internet, and MMS defined in the protocol)
     f. one or more domain descriptors
3. one or more route selection descriptors each including the following parameters:
   1) PDU session type and, optionally, the following parameter:
     a. session and service continuity (SSC) mode b. one or more single network slice selection assistance information (S-NSSAI)
     c. one or more DNNs
     d. preferred access type (3GPP or non-3GPP)
     e. multi-access preference
     f. time window
     g. location criteria
   2) non-seamless non-3GPP offload indication After the operating system obtains the TD parameter associated with the application and the UE obtains a URSP rule list from the network, a RSD matched is found based on the evaluation of the URSP rules and then data routing is selected based on a routing path indicated by the RSD parameter. Important input data in the URSP rule is parameters in TDs (TD parameters for short), and these parameters can be carried when the application initiates a network request or can be configured in other manners.

Currently, how to configure, for the terminal, TD parameters of multiple operators contracted with the application has not been clearly agreed in the protocol.

In view of the above problem, implementations of the disclosure provide a method for TD transmission. The detailed description is given below in conjunction with the accompanying drawings.

Figure 2:
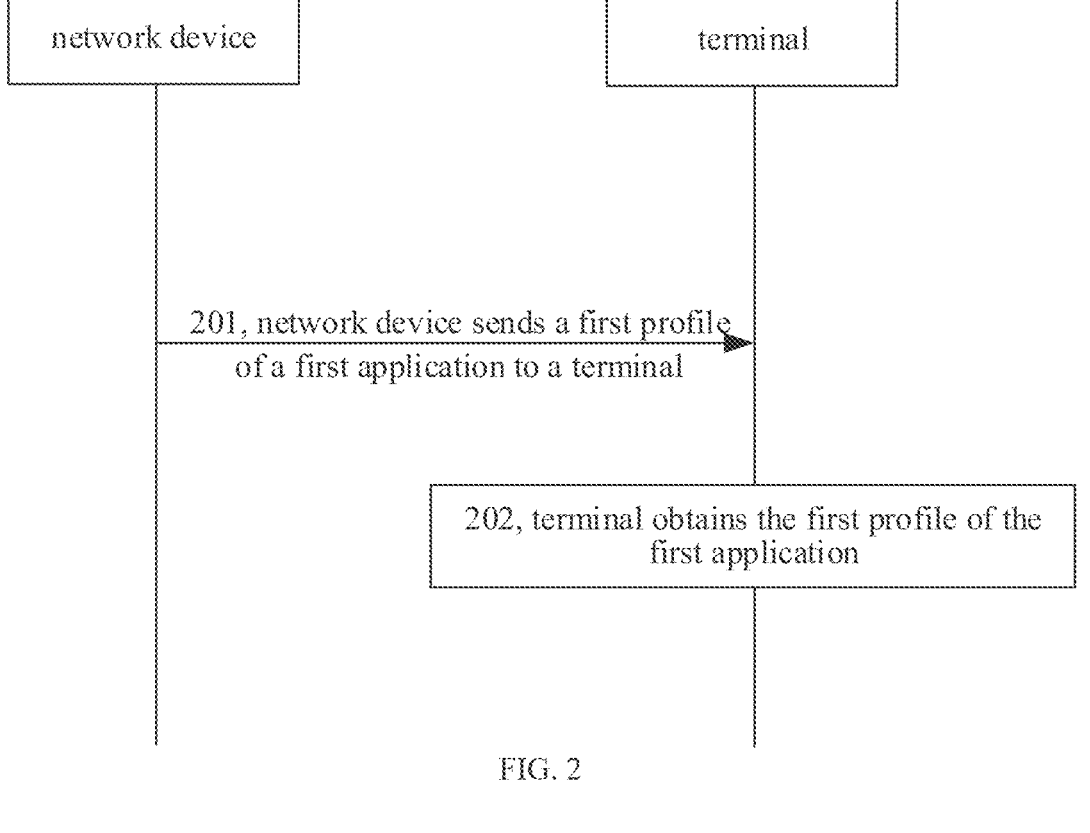
FIG. 2 is a schematic flow chart of a method for traffic descriptor (TD) transmission provided in implementations of the disclosure.

Referring to FIG. 2, FIG. 2 is a schematic flow chart of a method for TD transmission provided in implementations of the disclosure. As illustrated in the drawing, the method includes the following.

201, a network device sends a first profile of a first application to a terminal.

The first profile includes a TD parameter of the first application, and the TD parameter includes TD parameters of multiple operators contracted with the first application.

The first application can be a system application or a third-party application installed in the terminal, such as a video application, a game application, an office application, etc., which is not limited herein.

It should be noted that, the network device in operation 201 may be a base station in the mobile network (e.g. gNB in 5G system, responsible for transferring the first profile to the terminal), a network server at the core network side (e.g. PCF in 5GC), a third-party server for providing APK of the application, or a functional network element for providing an over-the-air (OTA) service at the network side, or a functional network element for providing a short message service at the network side, which is not limited herein.

The operation 201 is optional, and is not unique. That is, the terminal can obtain the first profile by purchasing a subscriber identity module (SIM) card offline, etc., and in this case, the network device does not need to send the first profile, or other terminals synchronize the first profile to the terminal through peer-to-peer transmission, etc.

202, the terminal obtains the first profile of the first application.

The first profile includes the TD parameter of the first application, and the TD parameter includes the TD parameters of the multiple operators contracted with the first application.

In the implementation, the TD parameter includes a correspondence between a first identifier and a first parameter.

The first identifier includes identifiers of mobile networks of the multiple operators and the first parameter is at least one parameter in the TD parameter.

In the implementation, the first parameter includes any of: DNN or connection capabilities.

In the implementation, the first identifier includes an MCC and an MNC.

In the implementation, the first identifier only includes the MNC.

For example, an application has signed a network slicing service with China Mobile and China Unicom, respectively, and the DNN assigned to China Mobile is cmdnn1 and the DNN assigned to China Unicom is cudnn1. The application can be configured with the following information (merely for illustration, form and content of the profile can be various) in the TD profile.

AppId=appid1//for example, AppId of the application is
    appid1 IP address="192.168.5.23"
Port="8080"
<dnn
mcc=460
mnc=00
dnn=cmdnn1//China Mobile dnn
/>
<dnn
mcc=460
mnc=01
dnn=cudnn1//China Unicorn dnn
/>

In an example, the traffic descriptor profile and the application package are issued at the same time (they can be issued in other manners). When the application is installed in the operating system, the operating system will get parameters such as a DNN matched based on the current SIM card information, so that the operating system can obtain a complete TD parameter of an operator corresponding to the application, to further perform matching associated with the URSP rule. After the operating system obtains the TD parameter of the application specific operator, the TD parameter can be compared with traffic descriptor parameters in the URSP rule of the operator. After the TD parameter is successful matched with the traffic descriptor parameters in the URSP rule of the operator, the RSD parameter is obtained and a PDU session is established or selected based on indication of the RSD parameter, to access a specified network slice.

As can be seen, in this example, for the scenario where TD parameter configuration information of multiple operators needs to be synchronized to the terminal when the application is signed with the multiple operators, the TD parameters of all the contracted operators are contained in the first profile while key TD parameters of various operators are accurately distinguished with aid of correspondence, to avoid confusion in use and improve the accuracy and success rate in use.

In the implementation, the first profile is sent in any of the following manners.

first, encapsulating the first profile into an application package (APK) of the first application through secondary encapsulation, and obtaining the first profile by decompressing the APK;

second, issuing the first profile by a network server of an operator, and receiving the first profile issued by the network server;

third, configuring the first profile in a SIM card, and obtaining the first profile from the SIM card;

fourth, configuring the first profile through an OTA service or a short message push service of a mobile network of an operator;

fifth, configuring the first profile through an operator application installed on the terminal, where the operator application updates the first profile through Overlay, and the operator application performs authentication through the SIM card (Android Overlay is a resource replacement mechanism that enables replacement of resource files without repackaging the APK); or sixth, configuring the first profile in an unsigned file attribute of the APK of the first application, where the TD parameter of each operator is signed through a private key of a corresponding operator.

For the first manner, the first profile is stored in the APK of the application through secondary encapsulation. Because the APK itself has anti-tampering mechanism, the security is good. The network device can be a third-party application server. The third-party application server stores the APK of the first application encapsulated with the first profile, and after receiving a download request from the terminal, the third-party application server pushes the APK of the first application to the terminal.

For the second manner, the network server of the operator transmits the first profile. As configuration information of TD parameters of multiple operators is involved, the network server may be a network server deployed by any operator or a network server deployed by the multiple operators. The network server gathers TD parameter configuration information of all operators for the first application, generates the first profile, and issues the first profile to a terminal which needs to use or is installed with the first application. In this way, in transmission of the first profile between the operator and the terminal, fewer or no transfer node exists, so that the security is more controllable and the transmission efficiency of the dedicated message is higher.

For the third manner, in the SIM card-related manner, offline installation and online update of the first profile are supported. In case of a virtual SIM card, network device push and configuration are supported. The operator can preset the first profile at the factory stage of the SIM card, and some necessary TD parameter configuration information of the operator to which the application is contracted is included into the first profile, which can be updated periodically after the SIM card is installed to the terminal, to keep consistent with the application of the terminal.

For the fourth manner, the first profile is directly transmitted through the OTA or short message push, the personalized push service based on user requirements at the terminal side can be achieved and flexibility can be improved.

For the fifth manner, the operator application performs authentication through the SIM card, which has high security.

For the sixth manner, an idle field in the unsigned file attribute (i.e., the file attribute without signature protection) of the APK is multiplexed, which improves utilization and transmission efficiency.

In the implementation, the first profile is obtained by: encapsulating the first profile into the APK of the first application through secondary encapsulation and obtaining the first profile by decompressing the APK. That is, for the first manner, obtaining, by the terminal, the first profile of the first application includes: downloading, by the terminal, a first APK of the first application; and obtaining, by the terminal, a second APK of the first application and the first profile by decompressing the first APK.

Specifically, for the configuration manner where the TD parameter profiles of the multiple operators are packaged into the application package through secondary encapsulation, when the application package is downloaded to the user terminal, two parts are obtained through decompression, where one part is the application package and the other part is the TD parameter profiles of the multiple operators. The operating system can obtain the corresponding TD parameters by obtaining the TD parameter profile of the application.

For example, application WeChat® has signed contracts with three operators: China Mobile, China Unicom, and China Telecom, and the TD parameter configured by the China Mobile operator is TD parameter 1, the TD parameter configured by the China Unicom operator is TD parameter 2, and the TD parameter configured by the China Telecom operator is TD parameter 3. In this case, the TD parameters in the first profile can be shown in Table 1, that is, the TD parameters configured by different operators can be presented in the same table.

TABLE 1

| Application | TD parameter configuration of all contracted operators |
|---|---|
| WeChat | TD parameter 1 |
| WeChat | TD parameter 2 |
| WeChat | TD parameter 3 |

In the implementation, the first profile is obtained by: configuring the first profile in the unsigned file attribute of the APK of the first application, where the TD parameter of each operator is signed through the private key of the corresponding operator. That is, for the sixth manner, obtaining, by the terminal, the first profile of the first application includes: downloading, by the terminal, the APK of the first application; obtaining, by the terminal, the unsigned file attribute of the first application by decompressing the APK of the first application; obtaining, by the terminal, from the unsigned file attribute, TD parameter configuration information of each of the multiple operators contracted with the first application; and performing, by the terminal, signature verification on the TD parameter configuration information of each operator, to obtain plaintext information of the TD parameters of the multiple operators.

Specifically, for the configuration manner where the TD parameter profiles of the multiple operators are configured in the unsigned file attribute of the APK, each operator and its TD parameter profile can be stored in the form of key-value, and each operator needs to sign its TD parameter configuration information separately, to avoid being tampered. When the APK is installed in the operating system, the operating system obtains the TD parameter profiles of all operators corresponding to the application by reading the unsigned file attribute, and then obtains the corresponding plaintext information of the TD parameters through signature verification respectively.

For example, application Taobao® has signed contracts with three operators: China Mobile, China Unicom, and China Telecom, and the TD parameters configured by the China Mobile operator is TD parameter 1 and TD parameter 2, the TD parameters configured by the China Unicom operator is TD parameter 3 and TD parameter 4, and the TD parameters configured by the China Telecom operator is TD parameter 5 and TD parameter 6. In this case, the terminal verifies TD parameter 1 and TD parameter 2 through the public key of China Mobile operator to obtain plaintext information of TD parameter 1 and TD parameter 2, verifies TD parameter 3 and TD parameter 4 through the public key of China Unicom operator to obtain plaintext information of TD parameter 3 and TD parameter 4, and verifies TD parameter 5 and TD parameter 6 through the public key of China Telecom operator to obtain plaintext information of TD parameter 5 and TD parameter 6. The three groups of TD parameters of the three operators are shown in Table 2, Table 3, and Table 4, respectively.

TABLE 2

| Application | TD parameter configuration of contracted operator |
|---|---|
| Taobao | TD parameter 1 |
| Taobao | TD parameter 2 |

TABLE 3

| Application | TD parameter configuration of contracted operator |
|---|---|
| Taobao | TD parameter 3 |
| Taobao | TD parameter 4 |

TABLE 4

| Application | TD parameter configuration of contracted operator |
|---|---|
| Taobao | TD parameter 5 |
| Taobao | TD parameter 6 |

The ciphertext information of the TD parameters is formed by encrypting plaintext with the private key. The private key can be synchronized by the operator to a developer of the third-party application, and the developer distributes the public key to a terminal installed with the corresponding application.

In the implementation, after obtaining, by the terminal, the first profile of the first application, the method further includes: obtaining, by an operating system of the terminal, a preset parameter of a first operator currently accessed by the terminal based on current SIM card information; querying, by the operating system of the terminal, the TD parameter of the first application based on the preset parameter, to obtain a first TD parameter of the first operator; querying, by the operating system of the terminal, a URSP rule based on the first TD parameter, to obtain a first RSD of the first operator; and establishing or selecting, by the operating system of the terminal, a first PDU session based on the first RSD, to access a network slice of the mobile network of the first operator.

In the implementation, the preset parameter includes at least one of: DNN, connection capabilities, Internet protocol (IP) descriptor, domain descriptor, application identifier (AppId) of an application, and non-Internet protocol descriptor (non-IP descriptor).

For example, if the operating system of the terminal obtains a matched first MNC of the first operator currently accessed by the terminal based on the current SIM card information, the TD parameter of the first application can be queried based on the first MNC, to obtain the first TD parameter of the first operator, and then the URSP rule can be queried based on the first TD parameter, to obtain the first RSD of the first operator.

For another example, if the operating system of the terminal obtains a matched first connection capability of the first operator currently accessed by the terminal based on the current SIM card information, the TD parameter of the first application can be queried based on the first connection capability, to obtain the first TD parameter of the first operator, and then the URSP rule can be queried based on the first TD parameter, to obtain the first RSD of the first operator.

|

As can be seen, in this example, after determining the preset parameter of the first operator currently accessed, the terminal can query the TD parameter obtained by parsing the first profile, to obtain the first TD parameter of the first operator relative to the first application. The terminal can then query the URSP to obtain the corresponding RSD, and finally establish or select the first PDU session based on the RSD, to access the network slice of the mobile network of the first operator. The first profile contains the TD parameters configured by all operators of the first application, and thus there is no need to query for multiple times in the whole process, but through one query, the first TD parameter corresponding to the preset parameter of the first operator currently accessed can be determined accurately, which is fast and efficient. Furthermore, compared with using the pre-configured TD parameter, in the implementation, the whole first profile is less likely to be tampered, which can prevent the TD parameters from being camouflaged and tampered and have good security.

As can be seen, in the implementation, the terminal obtains the first profile, where the first profile includes the TD parameter of the first application, and the TD parameter includes TD parameters of the multiple operators contracted with the first application. Therefore, through parsing the profile once, the terminal can obtain the TD parameter configuration information of all operators contracted with the first application, without redundant operations, which improves the efficiency of configuring the TD parameter for the application of the terminal.

Implementations of the disclosure provide a device for TD transmission which can be a terminal. Specifically, the device for TD transmission is used to execute the operations executed by the terminal in the above method for TD transmission. The device for TD transmission provided in implementations of the disclosure may include modules corresponding to corresponding operations.

In implementations of the disclosure, the device for TD transmission can be divided into functional modules based on the above method example. For example, various functional modules can be divided based on various functions, or two or more functions can be integrated into one processing module. The integrated module can be realized in the form of hardware or software function module. In implementations of the disclosure, the division of modules is schematic, which is merely a logical function division. In practical application, there may be other division.

Figure 3:
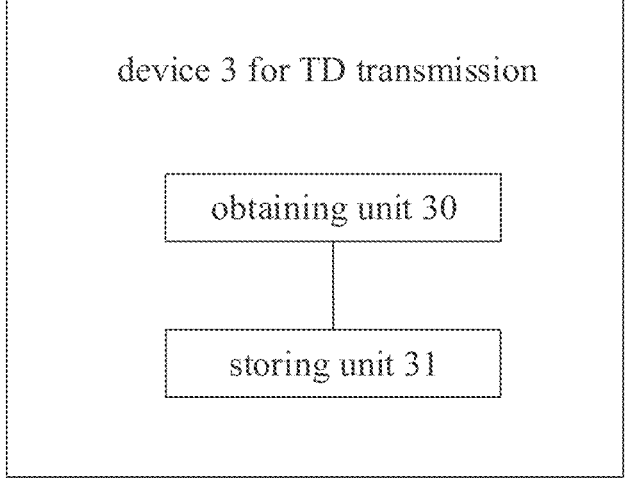
FIG. 3 is a block diagram of functional units of a device for TD transmission provided in implementations of the disclosure.

In the case of dividing various functional modules based on various functions, FIG. 3 shows a possible structural schematic diagram of the device for TD transmission involved in the above-mentioned implementations. As illustrated in FIG. 3, the device 3 for TD transmission includes an obtaining unit 30.

The obtaining unit 30 is configured to obtain a first profile of a first application, where the first profile includes a TD parameter of the first application, and the TD parameter includes TD parameters of multiple operators contracted with the first application.

In a possible example, the TD parameter includes a correspondence between a first identifier and a first parameter, where the first identifier includes identifiers of mobile networks of the multiple operators and the TD parameter includes the first parameter.

In a possible example, the first parameter includes any of: data network name (DNN) or connection capabilities.

In a possible example, the first identifier includes an MCC and an MNC.

In a possible example, the first identifier only includes an MNC.

In a possible example, the first profile is configured in any of the following manners:

first, encapsulating the first profile into an application package (APK) of the first application through secondary encapsulation, and obtaining the first profile by decompressing the APK;

second, issuing the first profile by a network server of an operator, and receiving the first profile issued by the network server;

third, configuring the first profile in a SIM card, and obtaining the first profile from the SIM card;

fourth, configuring the first profile through an OTA service or a short message push service of a mobile network of an operator;

fifth, configuring the first profile through an operator application installed on the terminal, where the operator application updates the first profile through Overlay, and the operator application performs authentication through the SIM card; or sixth, configuring the first profile in an unsigned file attribute of the APK of the first application, where the TD parameter of each operator is signed through a private key of a corresponding operator.

In a possible example, the first profile is a content in a signature block of the APK of the first application.

In a possible example, the device further includes a processing unit. The processing unit is configured to: obtain a preset parameter of a first operator currently accessed by the terminal based on current SIM card information; query the TD parameter of the first application based on the preset parameter, to obtain a first TD parameter of the first operator; query a URSP rule based on the first TD parameter, to obtain a first RSD of the first operator; and establish or select a first PDU session based on the first RSD, to access a network slice of the mobile network of the first operator, after the obtaining unit 30 obtains the first profile of the first application.

In a possible example, the preset parameter includes DNN.

All related contents of various operations involved in the above method implementations can be referred to the functional description of the corresponding functional modules, which will not be repeated herein. Apparently, the device for traffic descriptor transmission provided in implementations of the disclosure includes, but is not limited to, the above modules. For example, the device for traffic descriptor transmission may also include a storing unit 31. The storing unit 31 may be used to store program codes and data of the device for traffic descriptor transmission.

Figure 4:
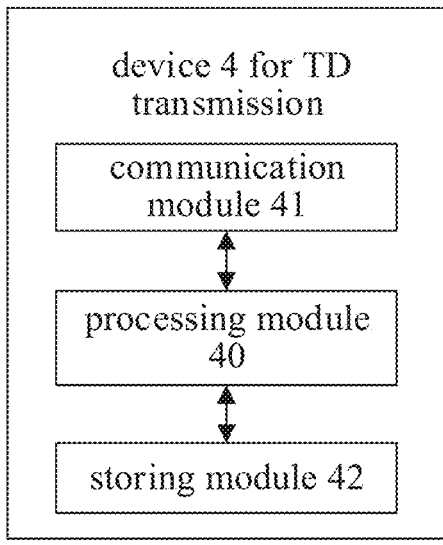
FIG. 4 is a block diagram of functional units of another device for TD transmission provided in implementations of the disclosure.

In the case of integrated unit, a structural schematic diagram of the device for TD transmission provided in implementations of the disclosure is illustrated in FIG. 4. In FIG. 4, the device 4 for TD transmission includes a processing module 40 and a communication module 41. The processing module 40 is used to control and manage actions of the device for TD transmission, for example, the operations performed by the obtaining unit 30 and/or other procedures for performing the techniques described herein. The communication module 41 is used to support the interaction between the device for TD transmission and other devices. As shown in FIG. 4, the device for TD transmission may further include a storing module 42, for storing program codes and data of the device for TD transmission, for example, storing contents stored in the above-mentioned storing unit 31.

The processing module 40 may be a processor or a controller such as a central processing unit (CPU), a general purpose processor, a digital signal processor (DSP), an ASIC, FPGA, or other programmable logic devices, transistor logic devices, hardware components or any combination thereof. The processing module 40 may implement or execute various exemplary logic blocks, modules, and circuits described in connection with the disclosure. The processor may also be a combination that implements computing functions such as a combination of one or more microprocessors, a combination of DSP and microprocessors, and the like. The communication module 41 may be a transceiver, a radio frequency (RF) circuit, or a communication interface, or the like. The storing module 42 may be a memory.

All relevant contents of various scenes involved in the above method implementations can be referred to the functional description of the corresponding functional modules, which will not be repeated herein. Both the device 3 for TD transmission and the device 4 for TD transmission can perform the operations performed by the terminal in the method for TD transmission shown in FIG. 2.

Implementations of the disclosure provide another device for TD transmission which can be a network device. Specifically, the device for TD transmission is used to execute the operations executed by the network device in the above method for TD transmission. The device for TD transmission provided in implementations of the disclosure may include modules corresponding to corresponding operations.

In implementations of the disclosure, the device for TD transmission can be divided into functional modules based on the above method example. For example, various functional modules can be divided based on various functions, or two or more functions can be integrated into one processing module. The integrated module can be realized in the form of hardware or software function module. In implementations of the disclosure, the division of modules is schematic, which is merely a logical function division. In practical application, there may be other division.

Figure 5:
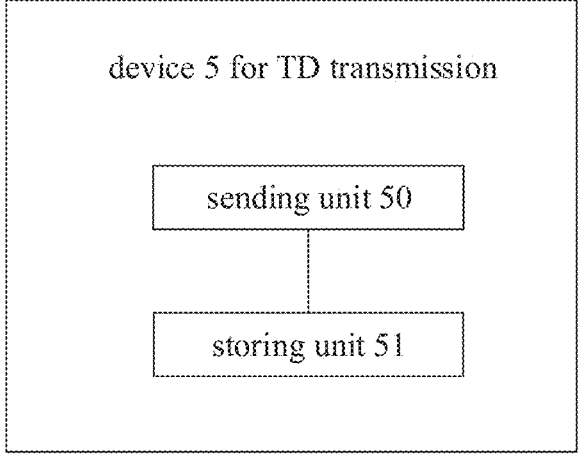
FIG. 5 is a block diagram of functional units of another device for TD transmission provided in implementations of the disclosure.

In the case of dividing various functional modules based on various functions, FIG. 5 shows a possible structural schematic diagram of the device for TD transmission involved in the above-mentioned implementations. As illustrated in FIG. 5, the device 5 for TD transmission includes a sending unit 50.

The sending unit 50 is configured to send a first profile of a first application to a terminal, where the first profile includes a TD parameter of the first application, and the TD parameter includes TD parameters of multiple operators contracted with the first application.

In a possible example, the TD parameter includes a correspondence between a first identifier and a first parameter, where the first identifier includes identifiers of mobile networks of the multiple operators and the first parameter is a parameter in the TD parameter.

In a possible example, the first parameter includes any of: data network name (DNN) or connection capabilities.

In a possible example, the first identifier includes an MCC and an MNC, or the first identifier only includes the MNC.

In a possible example, the first profile is configured in any of the following manners:

first, encapsulating the first profile into an application package (APK) of the first application through secondary encapsulation, and obtaining the first profile by decompressing the APK;

second, issuing the first profile by a network server of an operator, and receiving the first profile issued by the network server;

third, configuring the first profile in a SIM card, and obtaining the first profile from the SIM card;

fourth, configuring the first profile through an OTA service or a short message push service of a mobile network of an operator;

fifth, configuring the first profile through an operator application installed on the terminal, where the operator application updates the first profile through Overlay, and the operator application performs authentication through the SIM card; or sixth, configuring the first profile in an unsigned file attribute of the APK of the first application, where the TD parameter of each operator is signed through a private key of a corresponding operator.

In a possible example, the first profile is a content in a signature block of the APK of the first application.

All related contents of various operations involved in the above method implementations can be referred to the functional description of the corresponding functional modules, which will not be repeated herein. Apparently, the device for traffic descriptor transmission provided in implementations of the disclosure includes, but is not limited to, the above modules. For example, the device for traffic descriptor transmission may also include a storing unit 51. The storing unit 51 may be used to store program codes and data of the device for traffic descriptor transmission.

Figure 6:
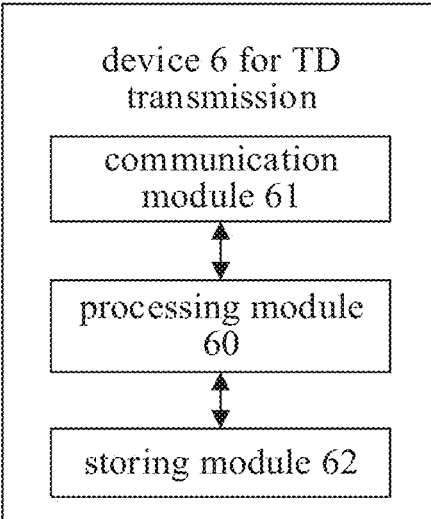
FIG. 6 is a block diagram of functional units of another device for TD transmission provided in implementations of the disclosure.

In the case of integrated unit, a structural schematic diagram of the device for TD transmission provided in implementations of the disclosure is illustrated in FIG. 6. In FIG. 6, the device 6 for TD transmission includes a processing module 60 and a communication module 61. The processing module 60 is used to control and manage actions of the device for TD transmission, for example, the operations performed by the sending unit 50 and/or other procedures for performing the techniques described herein. The communication module 61 is used to support the interaction between the device for TD transmission and other devices. As shown in FIG. 6, the device for TD transmission may further include a storing module 62, for storing program codes and data of the device for TD transmission, for example, storing contents stored in the above-mentioned storing unit 51.

The processing module 60 may be a processor or a controller such as a central processing unit (CPU), a general purpose processor, a digital signal processor (DSP), an ASIC, FPGA, or other programmable logic devices, transistor logic devices, hardware components or any combination thereof. The processing module 40 may implement or execute various exemplary logic blocks, modules, and circuits described in connection with the disclosure. The processor may also be a combination that implements computing functions such as a combination of one or more microprocessors, a combination of DSP and microprocessors, and the like. The communication module 61 may be a transceiver, a radio frequency (RF) circuit, or a communication interface, or the like. The storing module 62 may be a memory.

All relevant contents of various scenes involved in the above method implementations can be referred to the functional description of the corresponding functional modules, which will not be repeated herein. Both the device 5 for TD transmission and the device 6 for TD transmission can perform the operations performed by the network device in the method for TD transmission shown in FIG. 2.

Implementations of the disclosure further provide a chip. The chip includes a processor configured to invoke a computer program from a memory and run the computer program, to cause a device on which the chip is installed to perform part or all of operations described by the terminal in the above method implementations.

Implementations of the disclosure further provide a computer-readable storage medium. The computer-readable storage medium stores a computer program for electronic data interchange, where the computer program causes a computer to perform part or all of operations described by the terminal in the above method implementations.

Implementations of the disclosure further provide a computer-readable storage medium. The computer-readable storage medium stores a computer program for electronic data interchange, where the computer program causes a computer to perform part or all of operations described by the network device in the above method implementations.

Implementations of the disclosure further provide a computer program product. The computer program product is operable to cause a computer to perform part or all of operations described by the terminal in the above method implementations. The computer program can be a software installation package.

The operations of the method or algorithm described in implementations of the disclosure may be implemented in the form of hardware or in the form of executing software instructions by the processor. The software instructions may consist of corresponding software modules that may be stored in random access memory (RAM), flash memory, read only memory (ROM), erasable programmable ROM (EPROM), electrically EPROM (EEPROM), register, hard disk, movable hard disk, CD-ROM, or any other form of storage medium well known in the art. An exemplary storage medium is coupled to a processor to enable the processor to read information from and write information to the storage medium. Apparently, the storage medium can also be part of the processor. The processor and the storage medium may be in the ASIC. In addition, the ASIC may be in an access network device, a target network device, or a core network device. Apparently, the processor and the storage medium may also exist as discrete components in the access network device, the target network device, or the core network device.

For those skilled in the art, in one or more of the above examples, the functions described in implementations of the disclosure can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc The above-mentioned specific implementations further describe purposes, technical solutions, and advantageous effects of implementations of the disclosure in detail. It should be understood that, the above description is only the specific implementations of the disclosure and is not intended to limit the protection scope of implementations of the disclosure. Any modifications, equivalent substitutions, and improvements made on the basis of the technical solutions of implementations of the disclosure should be included in the protection scope of implementations of the disclosure.

The above-mentioned specific implementations further describe purposes, technical solutions, and advantageous effects of implementations of the disclosure in detail. It should be understood that, the above description is only the specific implementations of the disclosure and is not intended to limit the protection scope of implementations of the disclosure. Any modifications, equivalent substitutions, and improvements made on the basis of the technical solutions of implementations of the disclosure should be included in the protection scope of implementations of the disclosure.

What is claimed is:

1. A method for traffic descriptor (TD) transmission, comprising:

obtaining, by a terminal, a first profile of a first application, wherein the first profile comprises a TD parameter of the first application, the TD parameter comprises TD parameters of a plurality of operators contracted with the first application, and the first profile is configured by:

encapsulating the first profile into an application package (APK) of the first application through secondary encapsulation, and obtaining the first profile by decompressing the APK;

issuing the first profile by a network server of an operator, and receiving the first profile issued by the network server;

configuring the first profile in a subscriber identity module (SIM) card, and obtaining the first profile from the SIM card;

configuring the first profile through an over-the-air (OTA) service or a short message push service of a mobile network of an operator;

configuring the first profile through an operator application installed on the terminal, wherein the operator application updates the first profile through Overlay, and the operator application performs authentication through the SIM card; or configuring the first profile in an unsigned file attribute of the APK of the first application, wherein the TD parameter of each operator is signed through a private key of a corresponding operator, wherein based on the first profile being configured by configuring the first profile in the unsigned file attribute of the APK of the first application, wherein the TD parameter of each operator is signed through the private key of the corresponding operator, said obtaining, by the terminal, the first profile of the first application comprises:

downloading, by the terminal, the APK of the first application;

obtaining, by the terminal, the unsigned file attribute of the first application by decompressing the APK of the first application;

obtaining, by the terminal, from the unsigned file attribute, TD parameter configuration information of each of the plurality of operators contracted with the first application; and performing, by the terminal, signature verification on the TD parameter configuration information of each operator, to obtain plaintext information of the TD parameters of the plurality of operators.

2. The method of claim 1, wherein the TD parameter comprises a correspondence between a first identifier and a first parameter, wherein the first identifier comprises identifiers of mobile networks of the plurality of operators and the first parameter is a parameter in the TD parameter.

3. The method of claim 2, wherein the first parameter comprises any of: data network name (DNN) or connection capabilities.

4. The method of claim 3, wherein the first identifier comprises a mobile country code (MCC) and a mobile network code (MNC).

5. The method of claim 3, wherein the first identifier only comprises an MNC.

6. The method of claim 1, wherein based on the first profile being configured by encapsulating the first profile into the APK of the first application through secondary encapsulation and obtaining the first profile by decompressing the APK, said obtaining, by the terminal, the first profile of the first application comprises:

downloading, by the terminal, a first APK of the first application; and obtaining, by the terminal, a second APK of the first application and the first profile by decompressing the first APK.

7. The method of claim 1, further comprising:

obtaining, by the terminal, a preset parameter of a first operator currently accessed by the terminal based on current SIM card information;

querying, by the terminal, the TD parameter of the first application based on the preset parameter, to obtain a first TD parameter of the first operator;

querying, by the terminal, a user equipment route selection policy (URSP) rule based on the first TD parameter, to obtain a first route selection descriptor (RSD) of the first operator; and establishing or selecting, by the terminal, a first protocol data unit (PDU) session based on the first RSD, to access a network slice of the mobile network of the first operator.

8. The method of claim 7, wherein the preset parameter comprises at least one of: DNN, connection capabilities, Internet protocol (IP) descriptor, domain descriptor, application identifier (AppId) of an application, and non-Internet protocol descriptor (non-IP descriptor).

9. A terminal, comprising:

a memory storing computer programs; and a processor coupled with the memory and configured to invoke the computer programs to:

obtain a first profile of a first application, wherein the first profile comprises a TD parameter of the first application, the TD parameter comprises TD parameters of a plurality of operators contracted with the first application, and the first profile is configured by:

encapsulating the first profile into an application package (APK) of the first application through secondary encapsulation, and obtaining the first profile by decompressing the APK;

issuing the first profile by a network server of an operator, and receiving the first profile issued by the network server;

configuring the first profile in a subscriber identity module (SIM) card, and obtaining the first profile from the SIM card;

configuring the first profile through an over-the-air (OTA) service or a short message push service of a mobile network of an operator;

configuring the first profile through an operator application installed on the terminal, wherein the operator application updates the first profile through Overlay, and the operator application performs authentication through the SIM card; or configuring the first profile in an unsigned file attribute of the APK of the first application, wherein the TD parameter of each operator is signed through a private key of a corresponding operator, wherein based on the first profile being configured by configuring the first profile in the unsigned file attribute of the APK of the first application, wherein the TD parameter of each operator is signed through the private key of the corresponding operator, the processor configured to invoke the computer programs to obtain the first profile of the first application is configured to:

download the APK of the first application;

obtain the unsigned file attribute of the first application by decompressing the APK of the first application;

obtain from the unsigned file attribute, TD parameter configuration information of each of the plurality of operators contracted with the first application; and perform signature verification on the TD parameter configuration information of each operator, to obtain plaintext information of the TD parameters of the plurality of operators.

10. A non-transitory computer-readable storage medium storing a computer program which, when executed by a processor, causes the processor to perform:

obtaining a first profile of a first application, wherein the first profile comprises a TD parameter of the first application, and the TD parameter comprises TD parameters of a plurality of operators contracted with the first application, and the first profile is configured by:

encapsulating the first profile into an application package (APK) of the first application through secondary encapsulation, and obtaining the first profile by decompressing the APK;

issuing the first profile by a network server of an operator, and receiving the first profile issued by the network server;

configuring the first profile in a subscriber identity module (SIM) card, and obtaining the first profile from the SIM card;

configuring the first profile through an over-the-air (OTA) service or a short message push service of a mobile network of an operator;

configuring the first profile through an operator application installed on a terminal, wherein the operator application updates the first profile through Overlay, and the operator application performs authentication through the SIM card; or

configuring the first profile in an unsigned file attribute of the APK of the first application, wherein the TD parameter of each operator is signed through a private key of a corresponding operator, wherein based on the first profile being configured by configuring the first profile in the unsigned file attribute of the APK of the first application, wherein the TD parameter of each operator is signed through the private key of the corresponding operator, said obtaining the first profile of the first application comprises:

downloading the APK of the first application;

obtaining the unsigned file attribute of the first application by decompressing the APK of the first application;

obtaining from the unsigned file attribute, TD parameter configuration information of each of the plurality of operators contracted with the first application; and performing signature verification on the TD parameter configuration information of each operator, to obtain plaintext information of the TD parameters of the plurality of operators.

11. The terminal of claim 9, wherein the TD parameter comprises a correspondence between a first identifier and a first parameter, wherein the first identifier comprises identifiers of mobile networks of the plurality of operators and the first parameter is a parameter in the TD parameter.

12. The terminal of claim 11, wherein the first parameter comprises any of: data network name (DNN) or connection capabilities.

13. The terminal of claim 12, wherein the first identifier comprises a mobile country code (MCC) and a mobile network code (MNC).

14. The terminal of claim 12, wherein the first identifier only comprises an MNC.

15. The terminal of claim 9, wherein based on the first profile being configured by encapsulating the first profile into the APK of the first application through secondary encapsulation and obtaining the first profile by decompressing the APK, the processor configured to invoke the computer programs to obtain the first profile of the first application is configured to:

download a first APK of the first application; and obtain a second APK of the first application and the first profile by decompressing the first APK.

16. The terminal of claim 9, wherein the processor is further configured to invoke the computer programs to:

obtain a preset parameter of a first operator currently accessed by the terminal based on current SIM card information;

query the TD parameter of the first application based on the preset parameter, to obtain a first TD parameter of the first operator;

query a user equipment route selection policy (URSP) rule based on the first TD parameter, to obtain a first route selection descriptor (RSD) of the first operator; and establish or select a first protocol data unit (PDU) session based on the first RSD, to access a network slice of the mobile network of the first operator.

* * * * *